United States Patent [19]

Fu et al.

[11] 4,162,490
[45] Jul. 24, 1979

[54] TOILET TRAINING DEVICE

[76] Inventors: Fang-Cheng Fu; Chien-Hung Fu, both of 792 Oak Ridge Ct., Brighton, Mich. 48116

[21] Appl. No.: 872,568

[22] Filed: Jan. 26, 1978

[51] Int. Cl.² .................... G08B 21/00; A47K 11/02
[52] U.S. Cl. ........................................ 340/603; 4/134; 340/573; 340/667
[58] Field of Search ............... 340/573, 602, 603, 604, 340/612, 613, 618, 626; 4/134, 138

[56] References Cited
U.S. PATENT DOCUMENTS

| | | | |
|---|---|---|---|
| 2,663,861 | 12/1953 | Heath | 340/573 X |
| 3,020,528 | 2/1962 | Swanson, Jr. et al. | 340/573 X |
| 3,268,916 | 8/1966 | Hix, Jr. | 4/138 |

Primary Examiner—John W. Caldwell, Sr.
Assistant Examiner—Daniel Myer

[57] ABSTRACT

A battery-powered toilet training device has been developed using the state-of-art electronic devices to provide improved training of toddlers in orderly habits of discharging urine and stool as well. A non-contact electronic sensor is used to detect the presence of urine and stool in the receptacle. A battery-powered toy is used to produce an audible signal and a mechanical motion to reward the toddler and to signal the trainer when the toddler's elimination begins.

7 Claims, 6 Drawing Figures

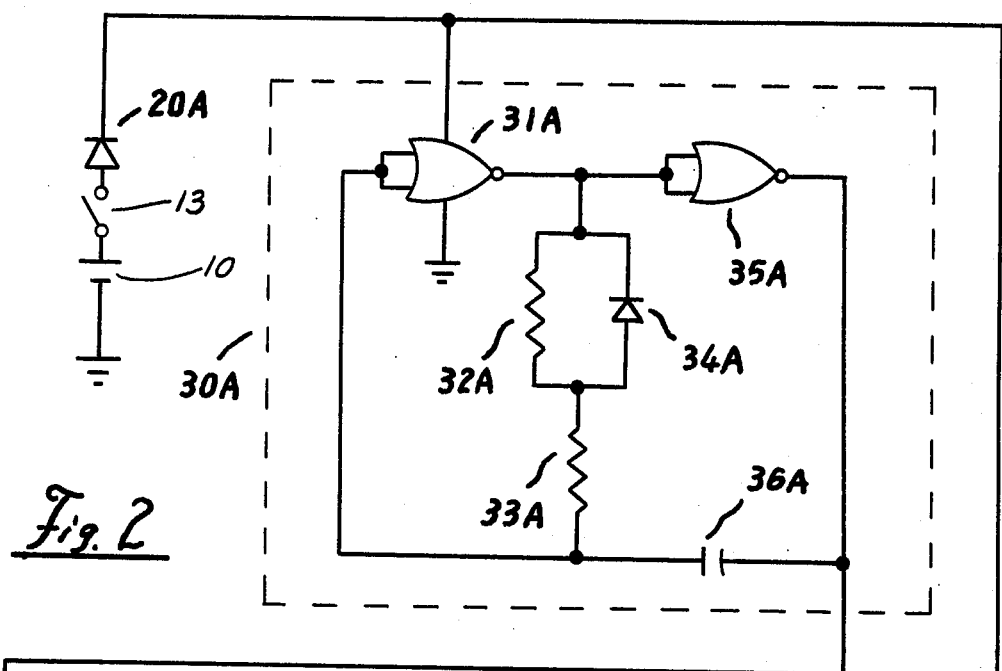
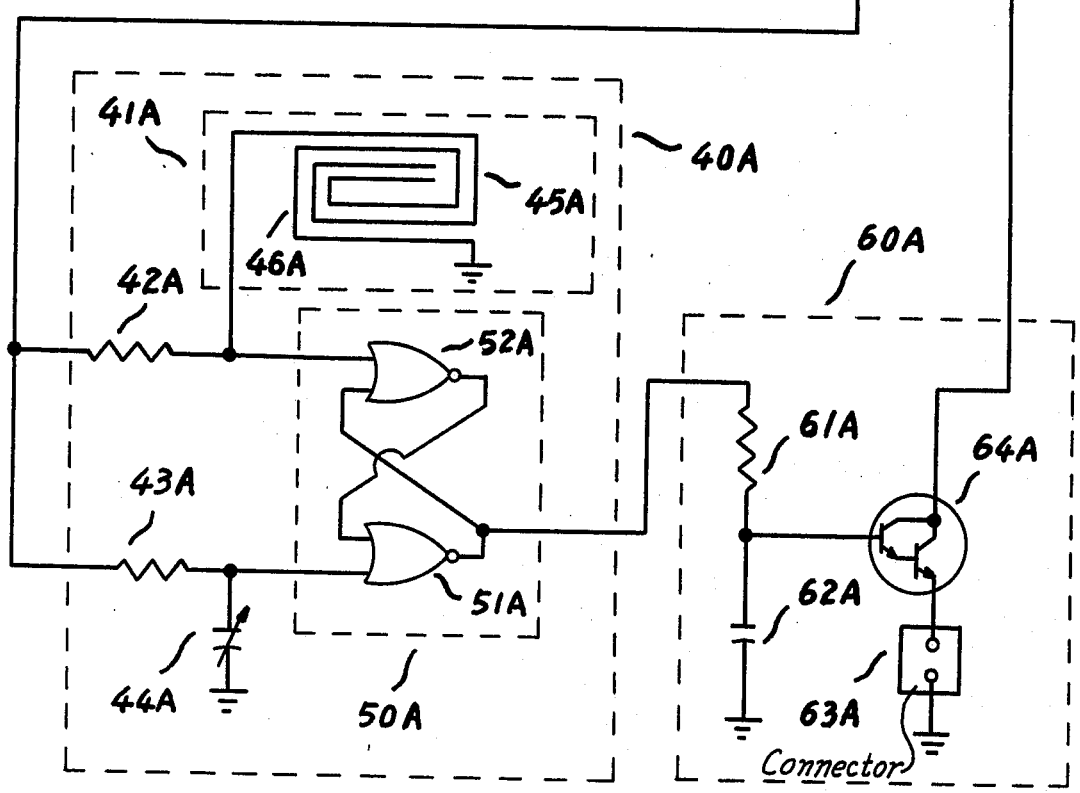
Fig. 2

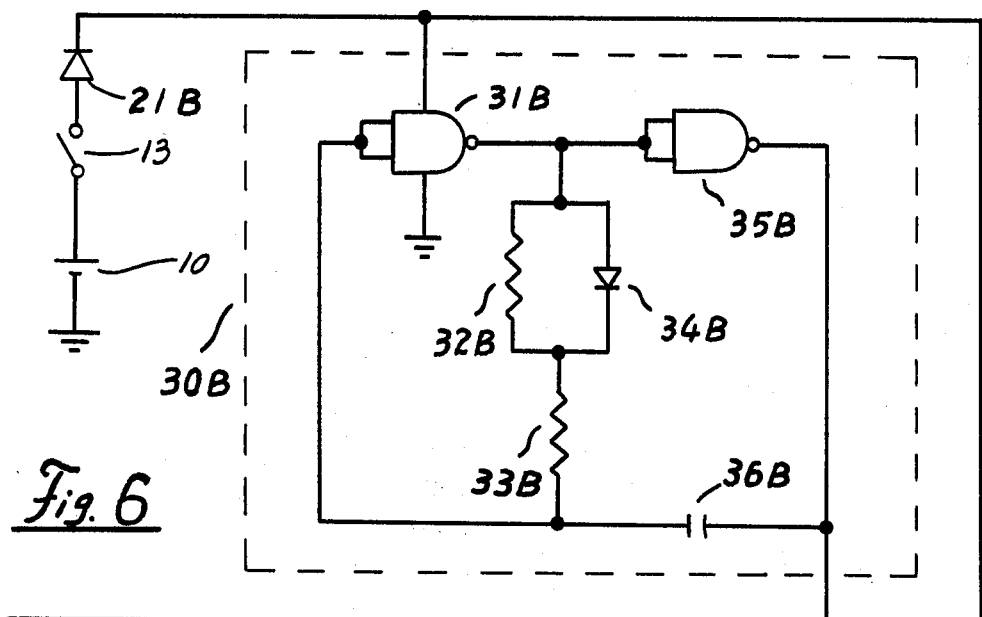
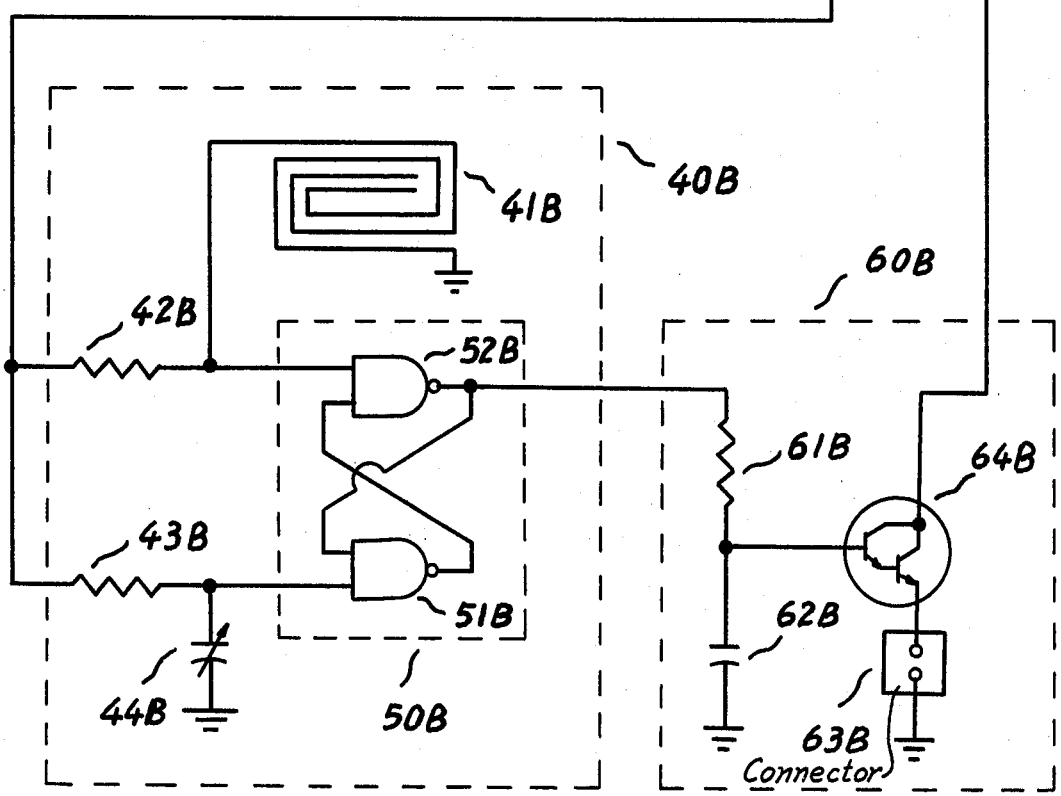
Fig. 6

TOILET TRAINING DEVICE

BACKGROUND OF THE INVENTION

This invention relates to a toilet training device and, more particularly, to a device for training toddlers in orderly habits of discharging urine and stool as well.

Toilet training is usually initiated when the toddler is about 18 months old. The toddler under training is not able to tell the timing for discharging urine and stool. For this reason, the trainer usually would guess the timing for the toddler, and the trainer would put the toddler on the training device. However, it is quite often that the toddler's timing is out of phase with the trainer's guessed timing. As a result, the toddler must usually be forced to try to discharge even though the toddler has very little elimination to be discharged. It is naturally that the toddler would react with hostility toward such enforced peroid on the training device. Described in the U.S. Pat. No. to Hix 3,268,916, the muscial device have been employed on training devices to reward the toddler with music and to signal the trainer with the same music when the elimination begins. Unfortunately, such devices heretofore have not been fully successful. First, it would neither reward the toddler with music nor signal the trainer with the same music if just the solid stool is discharged. It is common that the toddler would discharge just the urine at one time and just the stool at some other time. Secondly, it would not reward the toddler with anything while the toddler is sitting on the training device, especially, when the toddler's timing is out of phase with the trainer's guessed timing for discharging elimination. Thirdly, the trainer has to remember to rewind the music box after each use. Fourthly, the minimum amount of urine required to trigger the music box is not adjustable. Fifthly, the build-in music box is not interchangeable with other kind of entertaining devices.

Therefore, it is a broad object of this invention to provide a toilet training device using the state-of-art electronic devices and the modern philosophy in training to provide improved training of toddlers in orderly habits of discharging urine and stool as well.

Another object is to provide a toilet training device with a battery-powered toy to provide an audible signal and a mechanical motion when elimination begins.

Another object is to provide a toilet training device, as an incentive to use, a toy for the toddler to play with while the toddler is sitting on the training device.

Another object is to provide a toilet training device having the best sanitary features.

Another object is to provide a toilet training device with minimum maintanence and without any spring to be rewound.

Another object is to provide a toilet training device capable of giving a signal even when just the solid stool is discharged.

Another object is to provide a toilet training device with a mean of control for adjusting the amount of elimination required to reward the toddler and to signal the trainer with an audible signal and a mechanical motion.

Another object is to provide a toilet training device with a mean for interchanging the entertaining devices to be used to reward the toddler and to signal the trainer.

SUMMARY OF THE INVENTION

The present invention includes a conventional nursery training chair, a non-contact electronic sensor with a sensing board mounted at the bottom of the nursery training chair to provide a support for the receptacle and to detect the presence of urine and stool in receptacle, and a battery-powered toy to reward toddlers and to signal the trainer when the toddler's elimination begins.

The battery-powered non-contact electronic sensor consists of three subsystems, namely: pulse generator, capacitance comparator and output interface.

There are two pieces of conducting material insulated from each other and arranged to provide multiple small gaps scattered over the sensing board. The urine and stool in the receptacle dielectrically bridge those gaps so that the capacitance between those two pieces of conducting material increases. The capacitance comparator is used to detect the change of capacitance to bias the output transistor for energizing a battery-powered toy.

BRIEF DESCRIPTION OF THE DRAWINGS

The foregoing advantages of the present invention, together with other objects and advantages which may be attained by its use, will become apparent upon consideration of the following detailed description taken in conjunction with the drawings.

In the drawings, wherein like reference numerals identify corresponding components:

FIG. 2 is the schematic diagram of the non-contact electronic sensor.

FIG. 6 is the alternative embodiment of the non-contact electronic sensor.

DETAILED DESCRIPTION OF THE INVENTION

Figure 1:
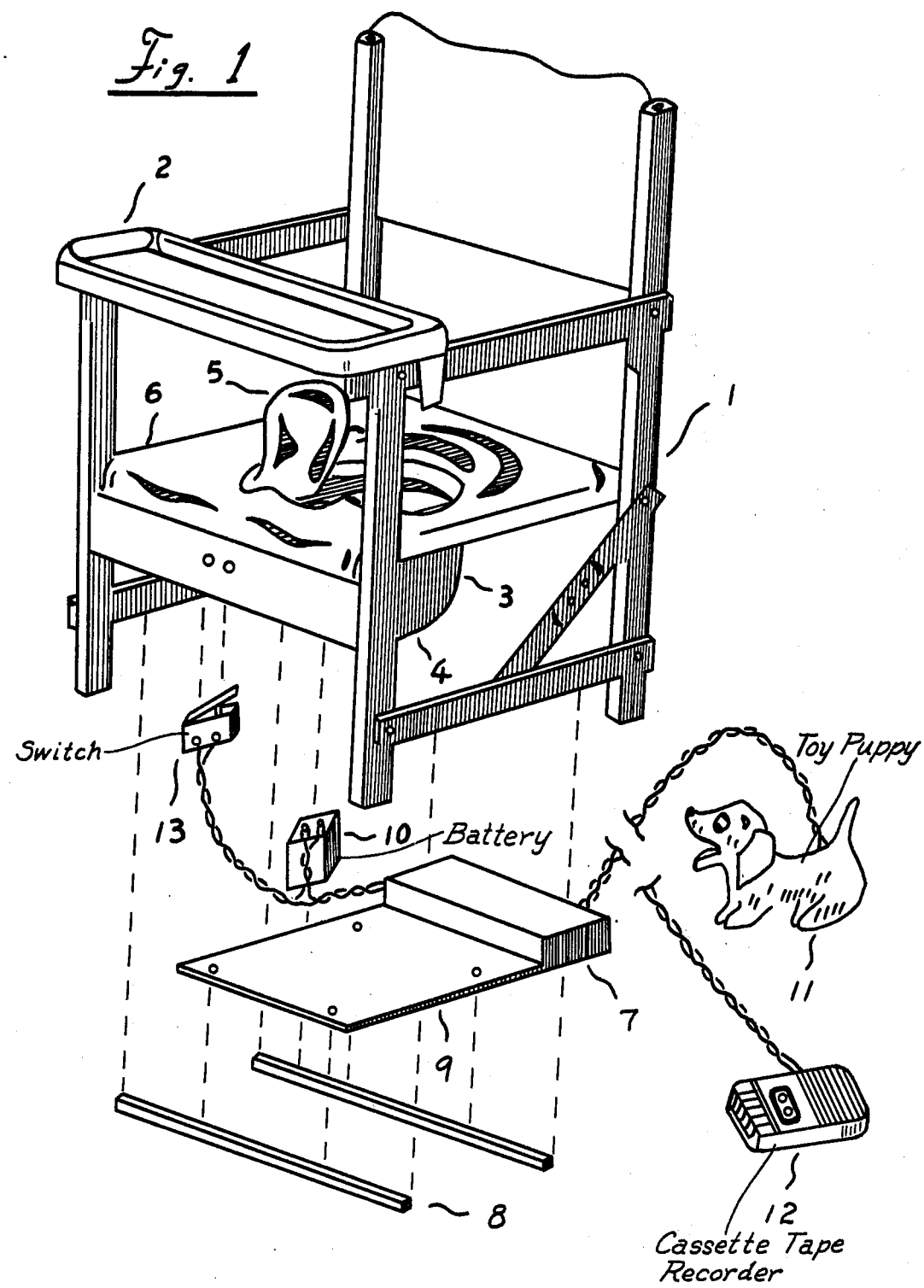
FIG. 1 is an exploded view of the training device embodying the principles of the present invention.

With reference first to FIG. 1, the training device embodying the principles of the present invention provides a nursery chair 1 with a tray 2, a receptacle 3, a reflector 5 and a seat surface 6 that can be lifted up from the front of the nursery chair 1. The wooden bars 8 are mounted on the nursery chair 1. The non-contact electronic sensor 7 with a sensing board 9 is mounted on the wooden bars 8 so that the receptacle 3 can be placed on top of the sensing board 9. The battery 10 is mounted on the wooden bars 8 and is connected to the non-contact electronic sensor 7. The non-contact electronic sensor 7 is connected to a sound-and motion-producing device, preferably a peppy puppy 11 and/or to a sound-producing device, preferably a cassette tape recorder 12. The pressure sensitive switch 13 is used to turn power on when the seat is occupied.

FIG. 2 is the schematic diagram of the non-contact electronic sensor 7, which is a non-contact surface bridging sensor and is composed of three subsystems, namely: pulse generator 30A, capacitance comparator 40A with a sensing element 41A, and output interface 60A. NOR gates 31A and 35A, diode 34A, resistors 32A and 33A, and capacitor 36A are used to generate pulse signal. Capacitor 44A is used to provide a reference capacitance. Resistor 43A and capacitor 44A are used to provide a reference RC time constant. Resistor 42A and capacitance of the sensing element 41A are used to provide a sensing RC time constant. NOR gates 51A and 52A are used as a latching flip-flop 50A. Resistor 61A and capacitor 62A are used as a ripple filter. The Darlington transistor 64A and connector 63A are used to interface with a battery-power toy. The battery 10 is used to power the system and the diode 20A is used to provide reverse polarity protection.

The sensing board 41A consists of two strips of conducting material "parallel" to each other and separated by a very small gap. The stripes are electrically insulated from each other and are adhered to the board. One stripe is connected to the output of pulse generator 30A and is a positive plate 45A. The other stripe is connected to the system ground and is a negative plate 46A.

OPERATION

Figure 3:
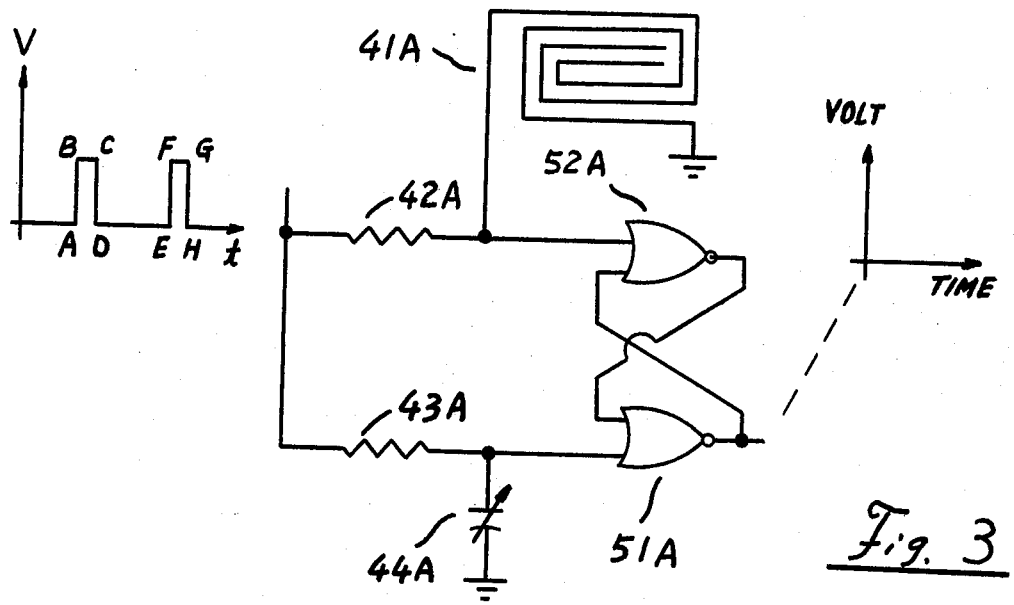
FIG. 3 is the schematic diagram of the capacitance comparator and its input and output waveforms when the receptacle is empty and dry.

In FIG. 2, when the output of inverter 35A is in a high or one state, capacitor 36A becomes positively charged. As a result, the input to inverter 31A is high and its output is low or zero. Resistor 33A and diode 34A are returned to the output of inverter 31A to provide a low resistive path to ground for discharge of capacitor 36A. As long as the output of inverter 31A is low, the output of inverter 35A is high. As capacitor 36A discharges, however, the voltage passes through the transfer-voltage point of inverter 31A, the output of inverter 31A becomes high, as a result, the output of inverter 35A becomes low and capacitor 36A is charged negatively. Resistors 32A and 33A, connected to the output of inverter 31A, then provides a high resistive charge path for the supply voltage. Capacitor 36A begins to charge to this voltage. Again, through the transfer voltage point of inverter 31A, the circuit changes state and the cycle repeats. Because of a low resistive path to ground for discharge of capacitor 36A when the output of inverter 35A is high and a high resistive path for capacitor 36A to charge to the supply voltage when the output of inverter 35A is low, the output of the pulse generator 30A stays low for longer time and stays high for a very short period of time as shown in FIG. 3. The output of pulse generator 30A is fed into capacitance comparator 40A through resistors 42A and 43A.

In FIG. 3, the capacitance of reference capacitor 44A is initially greater than that of sensing element 41A. When the output of pulse generator 30A goes from A to B, the voltage across sensing element 41A rises faster than that across reference capacitor 44A. As a result, the output of NOR gate 52A is high and that would keep the output of NOR gate 51A low through the feedback path. When the output of pulse generator 30A is high and stays high from B to C, the voltage output an NOR gate 51A stays zero. When the output of pulse generator 30A goes low and stays zero from D to E, the output of NOR gate 51A stays unchanged. As a result, the output of NOR gate 51A stays zero as long as the capacitance of sensing element 41A is less than that of reference capacitor 44A.

Figure 4:
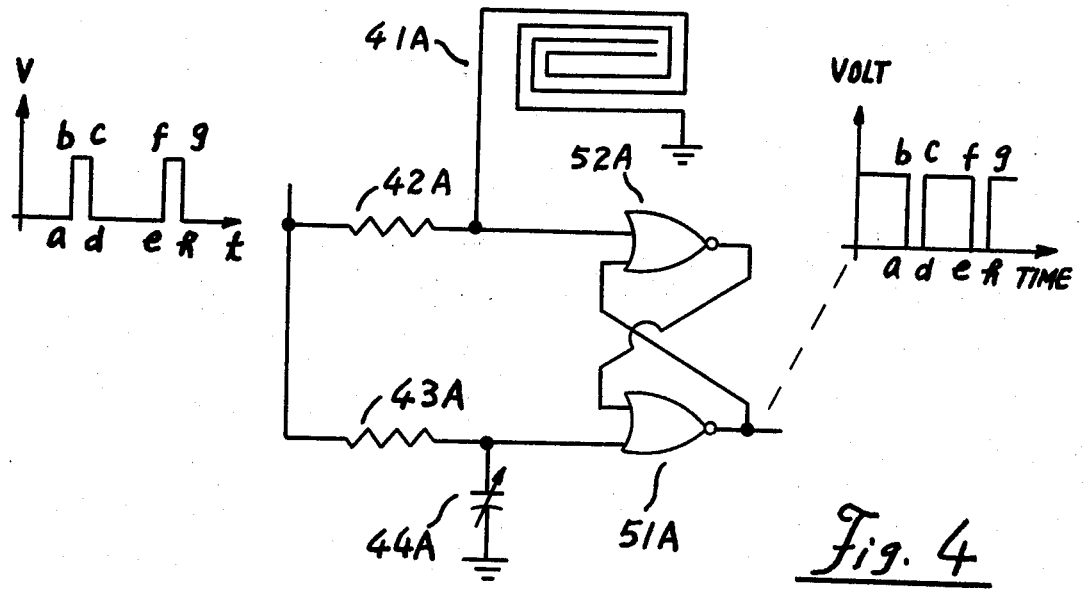
FIG. 4 is the schematic diagram of the capacitance comparator and its input and output waveforms when the receptacle has urine and/or stool in it.
Figure 5:
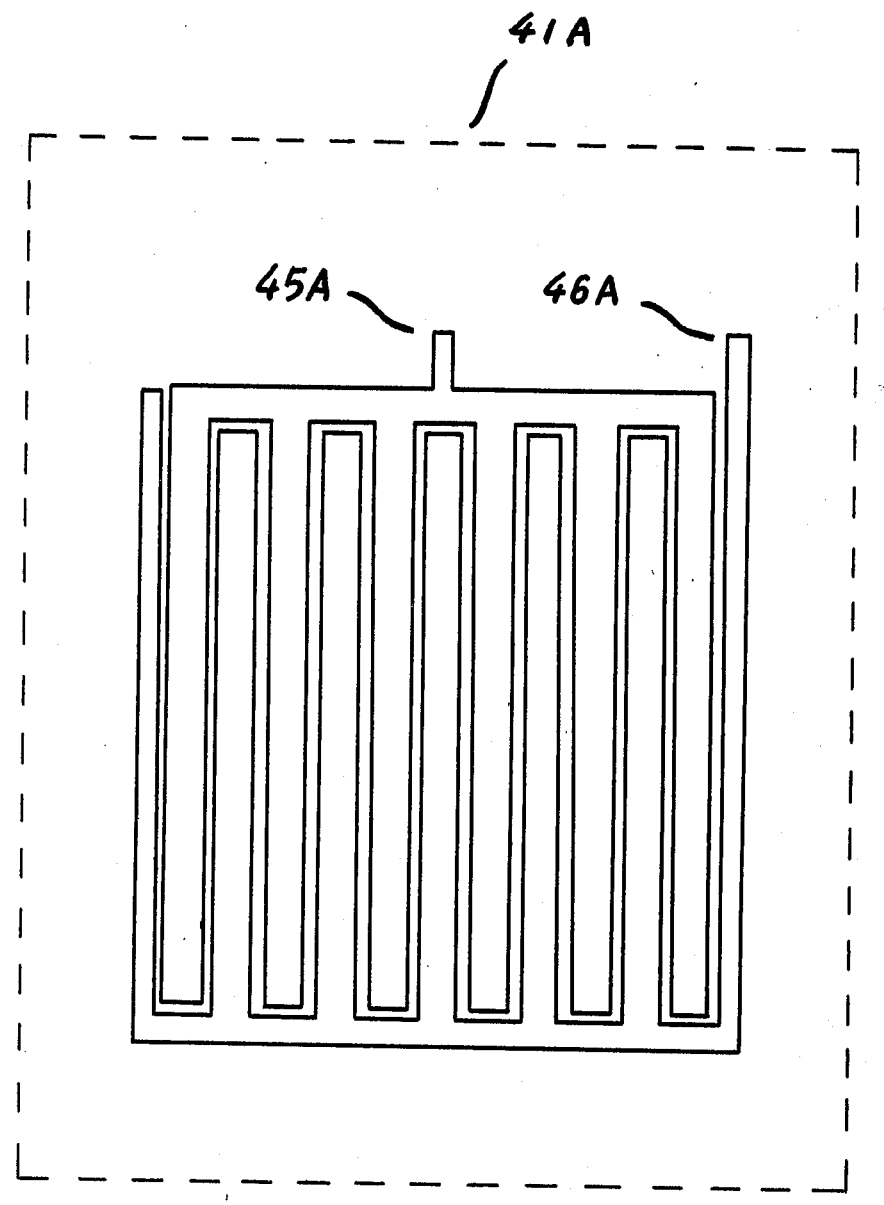
FIG. 5 is the printed circuit board layout of the sensing element.

However, upon contact of urine and/or stool against the inner bottom surface 4 of receptacle 3, the small gaps between positive plate 45A and negative plate 46A on the sensing board 9 are dielectrically bridged, and the capacitance of sensing element 41A increases. In FIG. 4, when the output of pulse generator 30A goes high from a to b, the voltage across sensing element 41A rises slower than that across reference capacitor 44A. As a result, NOR gate 51A goes high, and this high voltage would keep the output of NOR gate 52A stay low through the feedback path. When the output of pulse generator 30A stays high from b to c, both NOR gate 51A and 52A have zero output. When the output of pulse generator 30A goes low from c to d and stays low from d to e, the output of NOR gate 51A goes high and stays high as shown in FIG. 4.

FIG. 4 shows that when the urine and/or the stool is in the receptacle 3, the output of NOR gates 51A stays high most the time. This high duty-cycle pulse voltage is fed into output interface 60A through its ripple filter circuit to drive the base of Darlington transistor 64A and turn it into saturation state. As a result, the battery-powered toy is energized. If a peppy puppy is used, than it barks, and if a cassette tape recorder is used, then it plays music.

ALTERNATIVE EMBODIMENT

As shown in FIG. 6, alternative embodiment may use NAND gates as inverters 31B and 35B, and as flip-flop 50B. In this arrangement, the output of NAND gate 52B is fed into output interface 60B.

It is to be understood that the foregoing description is that of the preferred two embodiments of the invention. Various changes and modifications may be apparent to those skilled in the art, including, for example, equivalent integrated circuits and may be made without departing from the spirit and scope of the invention as defined by the appended claims.

What is claimed is:

1. A toilet training device which is readily adapted for use with conventional nursery training chairs wherein a non-contact electronic sensor is employed to detect dielectrically the presence of urine and stool in said receptacle which is placed on top of said sensing board for control of said battery-powered toy to reward the toddler and to signal the trainer when toddler's elimination begins comprising:
   a. nursery training chair means for training of toddlers in orderly habits of discharging urine and stool as well, said nursery training chair means comprising said seat surface with said deflector, said receptacle and said fixture;
   b. non-contact electronic sensor means, adapted to be mounted on said nursery training chair, for detecting said urine and stool in said receptacle;
   c. sensing board means, adapted to provide said support for said receptacle and said sensing element;
   d. a battery;
   e. a diode having an anode and a cathode series connected with said battery source, said anode being adapted to be coupled to said positive terminal of said battery source to provide reverse polarity protection;
   f. battery-powered toy means, adapted to be coupled to said non-contact electronic sensor, to provide said pleasant sound upon contact of said urine and stool against said inner surface of said receptacle;
   g. pressure sensitive switch means, adapted to be mounted on said nursery training chair, to turn the system on when the nursery training chair is occupied; and h. means coupling said non-contact electronic sensor, said battery, said diode, said pressure sensitive switch, and said battery-powered toy.

2. The toilet training device as recited in claim 1 wherein said non-contact electronic sensor means comprising
   a. pulse generator means, adapted to generate said repetitive step function for repetitive capacitance comparison;
   b. capacitance comparator means, adapted to compare said reference capacitance with said sensing capacitance, to produce a control signal when said sensing capacitance is greater than said reference capacitance;
   c. sensing element means, adapted to provide said positive plate and negative plate means for forming said sensing capacitor comprising said two pieces of said conducting material interlaced and insulated from each other to provide said scattered multiple small gaps to be bridged dielectrically by said urine and stool in said receptacle;
   d. output interface means, adapted to turn on said battery-powered toy when said control signal exists; and
   e. means coupling said pulse generator, said capacitance comparator, said sensing element, said output interface and said battery-powered toy.

3. The toilet training device as recited in claim 1 wherein said sensing board means comprising
   a. a piece of said printed circuit board means, adapted to provide said sensing element, and to house said non-contact electronic sensor; and
   b. means for providing said sensing element on said printed circuit board.

4. The toilet training device as recited in claim 2 wherein said pulse generator means comprising
   a. two inverters means;
   b. RC timing means for providing a long time constant in one direction of current flow and a short time constant for current flow in another direction, said RC timing means comprising resistor parallel connected with said diode and then series connected with second resistro and said capacitor; and
   c. means for coupling said inverters means and said RC timing means.

5. The toilet training device as recited in claim 2 wherein said capacitance comparator means comprising
   a. reference RC time constant means comprising resistor series connected with said reference capacitor;
   b. sensing RC time constant means comprising resistor series connected with said positive plate of said sensing element;
   c. flip-flop means for bistable operation in comparing said reference RC time constant means with said sensing RC time constant means, said flip-flop means comprising two-input switching gates crossing each other for latching operation; and
   d. means for coupling said reference RC time constant means, said sensing RC time constant means and said flip-flop means.

6. The toilet training device as recited in claim 2 wherein said output interface means comprising
   a. ripple filter means for smoothing pulse output from said capacitance comparator, said ripple filter means comprising a resistor series connected with said capacitor;
   b. emitter follower means comprising said Darlington transistor; and
   c. means coupling said ripple filter means, said emitter follower means and said battery-powered toy.

7. The toilet training device as recited in claim 5 wherein said reference capacitor means comprising
   a. reference capacitor means for providing adjustable reference RC time constant means, said reference capacitor means comprising said fixed capacitor and said capacitor trimmer; and
   b. means coupling said fixed capacitor and said capacitor trimmer to said capacitance comparator.

* * * * *